United States Patent [19]

Fujii et al.

[11] 3,879,495

[45] Apr. 22, 1975

[54] IMPACT-RESISTANT RUBBER-MODIFIED PLASTICS AND PROCESS FOR PRODUCING THE SAME

[75] Inventors: Yoshikazu Fujii, Ibaragi; Yasuyuki Kato; Masahiko Moritani; Hiroaki Maruyama, all of Niihama, all of Japan

[73] Assignee: Sumitomo Chemical Company, Limited, Osaka, Japan

[22] Filed: Nov. 14, 1973

[21] Appl. No.: 416,266

[30] Foreign Application Priority Data

Nov. 17, 1972 Japan............................... 47-115848
Nov. 17, 1972 Japan............................... 47-115857

[52] U.S. Cl.......... 260/878 R; 260/879; 260/880 R; 260/884; 260/885; 260/886
[51] Int. Cl. ............................................. C08f 15/00
[58] Field of Search................. 260/878 R, 884, 885

[56] References Cited
UNITED STATES PATENTS

| | | | |
|---|---|---|---|
| 3,475,516 | 10/1969 | Bauer et al. ........................ | 260/885 |
| 3,580,975 | 5/1971 | Rademacher................... | 260/878 R |
| 3,639,512 | 2/1972 | Sugimoto et al............... | 260/878 R |
| 3,646,164 | 2/1972 | Deichert et al. ................ | 260/878 R |
| 3,673,280 | 6/1972 | Minton et al. .................. | 260/878 R |

FOREIGN PATENTS OR APPLICATIONS

| | | | |
|---|---|---|---|
| 743,641 | 9/1966 | Canada........................... | 260/878 R |

*Primary Examiner*—Joseph L. Schofer
*Assistant Examiner*—A. Holler
*Attorney, Agent, or Firm*—Stevens, Davis, Miller & Mosher

[57] ABSTRACT

A novel, impact-resistant, rubber-modified plastic material having good aging resistance can be produced by polymerizing 40 to 99 parts by weight of at least one ethylenically unsaturated monomer capable of forming a plastic material having a glass transition temperature of 10°C or higher, in the presence of 1 to 60 parts by weight of an olefin-acrylate copolymer comprising as the essential components an olefin having 3 to 20 carbon atoms and an acrylate in which the alcohol moiety has 1 to 20 carbon atoms, particularly an alternating copolymer of the olefin and the acrylate, or an alternating interpolymer of the olefin, the acrylate in which the alcohol moiety has no ethylenic unsaturation, and 0.1 to 30 mole percent of the acrylate in which the alcohol moiety has ethylenic unsaturation.

25 Claims, No Drawings

IMPACT-RESISTANT RUBBER-MODIFIED PLASTICS AND PROCESS FOR PRODUCING THE SAME

This invention relates to a process for producing a rubber-modified plastic materials which comprises polymerizing at least one ethylenically unsaturated monomer (II) in the presence of an olefin-acrylate copolymer (I), said rubber-modified plastic materials being impact-resistant and excellent in resistance to weather and heat. This invention relates especially to a process for producing an impact-resistant methyl methacrylate resin with excellent transparency and weather resistance, which comprises polymerizing unsaturated monomers (II) comprising methyl methacrylate as the major component in the presence of an olefin-acrylate copolymer (I). This invention relates also to the reaction product produced by the process.

The present inventors already succeeded in effectively copolymerizing olefins with acrylates, and obtained particularly alternating copolymers for the first time (British Pat. Nos. 1,089,279; 1,123,722; 1,123,723 and 1,123,724). The inventors succeeded also in preparing multi-component copolymers by incorporating other monomers into the alternating copolymers, thereby imparting various functions thereto (British Pat. No. 1,187,105). The introduction of unsaturated groups results in sulfur-curable rubbers (French Pat. No. 71.07270); and the copolymerization in the presence of a halogen-containing ethylenically unsaturated compound as a third component monomer results in amine-curable rubbers (French Pat. No. 71.07271).

These copolymers were novel and hence were unknown in their properties, but the inventors found that the copolymers are well compatible with various rubbers or thermoplastic resins to give useful compositions (Japanese Pat. application Nos. 29,900/69; 19,442/70 and 46,675/72).

An object of the present invention is to provide a thermoplastic resin composition excellent in impact-resistance. The olefin-acrylate copolymer (I) used in the present invention is an amorphous elastomer, in general, and can improve the impact-resistance of a thermoplastic resin when dispersed therein. What is particularly important is that the impact-resistant resin composition of the present invention is excellent in resistance to aging, weather and heat.

Conventional impact-resistant thermoplastic resin compositions are obtained, in most cases, by dispersing butadiene rubbers into thermoplastic resins, and include, for example, ABS resins, impact-resistant polystyrenes and MBS resins. These resins contain butadiene as a rubber constituent, and hence, show high impact-resistance. However, the said resins are poor in heat-and weather-resistance, because of their having double bonds in the molecule, and hence, it is particularly undesirable to use them at elevated temperatures or outdoors. On the other hand, it has also been proposed to improve the impact-resistance of thermoplastic resins by addition of ethylene-vinyl acetate copolymers or acrylic rubbers thereto. These rubber components, however, are not always suitably dispersed in the resins, and the resulting resin compositions are unsatisfactory in water- and alkali-resistance. The olefin-acrylate copolymer (I) used in the present invention is made excellent in water- and hydrolysis-resistance by introducing olefin thereinto.

In view of such actual state as mentioned above, the present inventors have done extensive research on impact-resistant rubber-modified plastic materials excellent in weather- and heat-resistance to find that a rubber-modified plastic material excellent not only in impact-resistance but also in aging-, weather- and heat-resistance can be obtained by polymerizing at least one ethylenically unsaturated monomer (II) in the presence of an olefin-acrylate copolymer (I). What is important here is that the ethylenically unsaturated monomer (II) is polymerized in the presence of the above-mentioned copolymer (I), whereby there are obtained plastic materials which are more excellent in impact-resistance than a mere dispersion mixture of the olefin-acrylate copolymer (I) and a polymer of at least one ethylenically unsaturated monomer (II). This may be due to the grafting effect and molecular dispersion.

In particular, polymethyl methacrylate or a polymer comprising a major amount of methyl methacrylate has excellent transparency, gloss and weather-resistance. The polymer has not only excellent mechanical properties but also superior dimensional stability at high temperatures. But the polymer does not always have a good impact-strength and has been rather regarded as a fragile resin. Therefore, enhancement of impact-strength of the resin has been strongly desired.

In order to improve the impact-strength of the methyl methacrylate polymer, there has been known a process which comprises mixing the methyl methacrylate polymer with a butadiene-containing rubbery copolymer as the rubbery substance, as described in, for example, Japanese Pat. Publication No. 17,806/68. However, the products obtained by this known process have double bonds remaining in the rubbery substance and hence tend to be subjected to deterioration by light, and the excellent weather-resistance which is one of the features of the methyl methacrylate polymer is lost. As a method in which a rubbery substance having no double bond is used, there is known a method which comprises mixing an ethylene-vinyl acetate copolymer as the rubbery substance with a methyl methacrylate polymer, as described in, for example, Japanese Pat. Publication No. 16,186/72. According to the method, however, the resulting resin composition has a low impact-strength owing to poor compatibility of said ethylene copolymer with the methyl methacrylate polymer, and is non-transparent owing to difference in refractive index between the two. That is, the excellent transparency of the methyl methacrylate polymer is not imparted to the composition.

In view of the aforesaid actual state, the present inventors have done extensive research on methyl methacrylate resins excellent in weather-resistance, impact-strength and transparency, to find that methyl methacrylate resins with excellent transparency, impact-resistance and weather-resistance can be produced, by subjecting to radical polymerization (II) methyl methacrylate monomer or an unsaturated monomer mixture comprising a major amount of methyl methacrylate, in the presence of (I) a copolymer containing as the essential components at least one olefin and at least one acrylate, particularly an olefin-acrylate copolymer which contains as an essential component at least one acrylate or methacrylate, in which the alcohol moiety has ethylenic unsaturation, said (I) and (II) being chosen so that the difference in refractive index between the resin obtained from (II) and the copolymer (I) may not exceed a certain value.

The olefin-acrylate copolymer (I) used in the present invention includes a wide range of copolymers comprising as the essential components at least one olefin and at least one acrylate, and in addition, modified olefin-acrylate copolymers obtained by copolymerizing said monomers with one or more other copolymerizable monomers.

Thus, in accordance with the present invention, there is provided a process for producing an impact-resistant, rubber-modified, plastic material, characterized by polymerizing 40 to 99 parts by weight of at least one ethylenically unsaturated monomer (II) capable of forming a plastic material having a glass transition temperature of 10°C. or higher in the presence of 1 to 60 parts by weight of an olefin-acrylate copolymer (I) comprising as the essential components at least one olefin having 3 to 20 carbon atoms and at least one acrylate in which the alcohol moiety has 1 to 20 carbon atoms.

Further the present invention provides a process for producing an impact-resistant rubber-modified plastic material, characterized by polymerizing 49 to 99 parts by weight of at least one ethylenically unsaturated monomer (II) capable of forming a plastic material having a glass transition temperature of 10°C or higher, in the presence of 1 to 60 parts by weight of an olefin-acrylate copolymer (I) comprising at least one olefin having 3 to 20 carbon atoms, at least one acrylate in which the alcohol moiety has 1 to 20 carbon atoms, and 0.1 to 30 mole % of at least one copolymerizable monomer selected from styrene and its homologs, dienic hydrocarbons, dienic halohydrocarbons, unsaturated esters of carboxylic acids, unsaturated ethers, acrylonitrile, acryloyl halides, acrylic acid, acrylamide and its homologs, and maleic acid and its derivatives. Especially, the copolymerizable monomer is useful to have at least one unsaturated group besides the polymerizable double bond. Such polymerizable monomers having unsaturated group are preferably dienic hydrocarbons, dienic halohydrocarbons, unsaturated esters of unsaturated carboxylic acids, and unsaturated ethers. These copolymerizable monomers preferably have 2 to 30 carbon atoms.

Particularly, the present invention provides a process for producing an impact-resistant rubber-modified plastic material, characterized by polymerizing 40 to 99 parts by weight of at least one ethylenically unsaturated monomer (II) capable of forming a plastic material having a glass transition temperature of 10°C or higher, in the presence of 1 to 60 parts by weight of an olefin-acrylate copolymer (I) comprising as the essential components at least one olefin having 3 to 20 atoms, at least one acrylate, the alcohol moiety of which has 1 to 20 carbon atoms and has no ethylenic unsaturation, and 0.1 to 30 mol % of at least one acrylate, the alcohol moiety of which has ethylenic unsaturation and 2 to 20 carbon atoms.

As the olefin-acrylate copolymer (I) of the present invention, preferable are copolymers comprising 5 to 60 mol %, particularly 30 to 50 mol %, of the olefin and 40 to 95 mol %, particularly 50 to 70 mol %, of the acrylate. In the present invention, alternating copolymers are particularly important. In the case of a two component copolymer consisting of an olefin and an acrylate, the alternating copolymer thereof is composed of about 50 mol % of the olefin units and about 50 mol % of the acrylate units, substantially all of which are alternately bonded to each other. Alternating interpolymers incorporating third components have the same reactivity as that of the olefin or the acrylate depending upon the kind of the third component monomers, and the classification thereof is disclosed in British Pat. No. 1,187,105.

As the olefin in the olefin-acrylate copolymer (I) used in the present invention, any of olefin compounds copolymerizable with the acrylate may be used, and particularly preferable are aliphatic olefin hydrocarbon compounds having 3 to 20 carbon atoms. Among these, isobutylene and propylene are particularly important, and are effective for the preparation of excellent copolymers. Other effective olefins are terminally unsaturated olefins, particularly isoolefins. If necessary, internal olefins copolymerizable with the acrylate may also be used. Alternatively, olefin compounds having halogen substituents in other position than the ethylenic unsaturation may also be used. Examples of the above-mentioned olefins include isobutylene, propylene, butene-1, 2-methylbutene-1, 2-methylpentene-1, hexene-1, butene-2, 4-methylpentene-1, β-methallyl chloride, 2-methyl-4-chloro-pentene-1, octadecene-1 and the like. These olefin compounds belong to the group (A) monomers mentioned hereinafter.

In the case of the acrylate compounds containing no ethylenic unsaturation in the alcohol moiety to be copolymerized with the olefins, the alcohol moiety is preferably a hydrocarbon group having 1 to 20 carbon atoms or a halogen-substituted derivative thereof. These groups include, for example, alkyl, aryl, aralkyl, cycloalkyl and the like, and halogen-substituted derivatives thereof.

Concrete examples of these compounds include methyl acrylate, ethyl acrylate, propyl acrylate, n-butyl acrylate, t-butyl acrylate, n-amyl acrylate, n-hexyl acrylate, 2-ethylhexyl acrylate, octadecyl acrylate, o-tolyl acrylate, benzyl acrylate, cyclohexyl acrylate, 2-chloroethyl acrylate, and the like.

The olefin-acrylate copolymers (I) used in the present invention have, in general, a high molecular weight, and those having an intrinsic viscosity of, for example, from 0.1 to 10 dl/g as measured in benzene at 30°C are effectively used. When the intrinsic viscosity thereof is less than 0.1 dl/g, the resulting rubber-modified plastic materials have undesirably low impact strengths, and on the other hand, when it is more than 10 dl/g, said copolymer is difficult to dissolve uniformly in the ethylenically unsaturated monomers (II).

The olefin-acrylate copolymer (I) used in the present invention comprises the olefin and the acrylate, if necessary the acrylate containing ethylenic unsaturation in the alcohol moiety, and there may also be used interpolymers obtained by incorporating other ethylenically unsaturated monomers thereinto, whereby polymer characteristics are improved. As these ethylenically unsaturated monomers, a variety of monomers may be used according to desires, though the group (A) and (B) monomers effective in alternating copolymerization are particularly preferable. Preferable as these compounds are the monomers described in, for example, British Pat. Nos. 1,187,105 and 1,280,030. That is, as preferable compounds, there can be exemplified the group (A) monomers, the representatives of which are α-olefins, internal olefins, haloolefins, styrene homologues, diene compounds, unsaturated esters of carboxylic acids, unsaturated ethers, and the like, and the group (B) monomers, the representatives of which are acrylonitrile, acryloyl halides, acrylic acid, acrylamides and the like.

What is important as the third monomer component of the olefin-acrylate copolymer in the present invention is a monomer having two or more ethylenic unsaturations, and preferable are those monomers capable of producing copolymers having an ethylenic unsaturation in the side chain in order to keep the weather resistance. As shown by the present invention, acrylates containing ethylenic unsaturation in the alcohol moiety having 2 to 20 carbon atoms are particularly effective, and said unsaturated esters of acrylic acid are preferably contained in an amount of 0.1 to 30 mol %, more preferably 0.2 to 20 mol %, in the interpolymer.

Preferable acrylates having ethylenic unsaturation in the alcohol moiety are those having 2 to 20 carbon atoms in the alcohol moiety of halogen-substituted derivatives thereof. These alcohol moieties include, for example, alkenyl, aralkenyl, alkenylaryl, cycloalkenyl and the like or halogen-substituted derivatives thereof. Specifically, these compounds are vinyl acrylate, allyl acrylate, isobutenyl acrylate, 1'-butenyl acrylate, crotyl acrylate, cinnamyl acrylate, 3'-cyclopentenyl acrylate, citronellyl acrylate, geranyl acrylate, 5'-norbornene-2'-yl-methyl acrylate, β-chloroallyl acrylate and the like.

Copolymerization of the olefin and the acrylate for the preparation of the olefin-acrylate copolymers (I) used in the present invention may be carried out in any polymerizing method, and in order to obtain a high molecular weight copolymer, the addition of a Lewis acid capable of forming a complex with the carbonyl group of the acrylate, such as a metal halide or the like, gives a favorable result because a degradative chain-transfer reaction due to the olefins becomes difficult to occur. As this kind of Lewis acid, any compound capable of forming a complex with a lone pair of electron of the carbonyl group may be used and, for example, halides of elements of Group IIb, IIIb, IVb, Vb and VIII of the Mendeleev Periodic Table, particularly halides of aluminum, boron, zinc, tin and the like are effective. For example, there may be exemplified aluminum chloride, alkylaluminum halides, boron trichloride, boron trifluoride, alkylboron halides, zinc chloride, stannic tetrachloride, alkyltin halides and the like. This complex copolymerization is initiated and promoted by a radical polymerization catalyst, oxygen, organometallic compounds, light, radiations and the like.

The particularly important reaction is a copolymerization reaction which produces an alternating copolymer. In order to obtain an alternating copolymer effectively, a system in which an aluminum or boron compound is used as a catalyst is particularly preferable. These polymerization methods are described in detail in, for example, British Pat. Nos. 1,187,105 and 1,280,030. That is, these systems form a complex with the carbonyl group of the acrylate, and simultaneously the organoaluminum halide or organoboron halide acts as an initiator to give an alternating copolymer effectively. The particularly preferable system is a system in which an organoaluminum halide or an organoboron halide or a component equivalent thereto is employed.

A preferable catalyst system for obtaining an alternating copolymer consists of a compound having the formula, $MR_nX_{3-n}$ wherein M stands for aluminum or boron; R stands for a hydrocarbon group having 1 to 20 carbon atoms; X stands for halogen atom; and $n$ is any value of $0 < n < 3$, particularly 1, 1.5 or 2.

Among them, preferable are alkylaluminum dihalides, alkylaluminum sesquihalides, dialkylaluminum halides, alkylboron dihalides and dialkylboron halides. Particularly, alkylaluminum sesquihalides, and alkylboron dihalides are effective. Ethylaluminum sesquichloride and ethylboron dichloride are representatives thereof.

As the ethylenically unsaturated monomers (II) used in the present invention, there may generally be used in compounds which have a polymerizable carbon-carbon double bond and which form plastic materials having a glass transition temperature of 10°C or higher by polymerization or copolymerization, and the monomers preferably have 2 to 30 carbon atoms. Particularly, vinyl or vinylidene compounds having the formula,

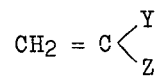

wherein Y and Z stand independently for hydrogen, a halogen, a group selected from —R, —COOR,

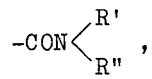

—COX, —COOH, —COR, —OR, —OCOR and —CN, in which R stands for a hydrocarbon group, or a hydrocarbon group containing at least one of halogen, O and N; and R' and R" stand independently for a hydrocarbon group, are preferable. The hydrocarbon group has preferably 1 to 20 carbon atoms, especially 1 to 8 carbon atoms. That is, as these monomers, there are preferably α-olefins, haloolefins, styrenes, other vinyl and vinylidene-hydrocarbons and halohydrocarbons, acrylates, methacrylates, acrylamides, methacrylamides, acryloyl halides, methacryloyl halides, acrylic acid, methacrylic acid, vinyl ketones, vinyl ethers, vinyl carboxylates, acrylonitrile, methacrylonitrile and the like. As R containing a hetero atom, there may be exemplified halohydrocarbon groups and hydrocarbon or halohydrocarbon groups having ether group, epoxy group, ketone group, hydroxy group, ester group, carboxyl group, acid anhydride group, acid halide group, amino group, amido group, nitrile group or the like. As the hydrocarbon groups, preferable are alkyl, aryl, aralkyl, alkylaryl, cycloalkyl, alkenyl, aralkenyl, alkenylaryl, cycloalkenyl and the like. As other compounds having a substituent at a β-position which do not belong to the aforesaid compounds, there are preferable maleic acid, fumaric acid, maleic ester, fumaric ester, maleic anhydride, maleimides, vinyl pyridine and the like.

Concrete examples of monomers suitable for these objects include, for example, ethylene, propylene, butene-1, butene-2, isobutylene, pentene-1, 2-methylbutene-1, 4-methylpentene-1, 2-methylpentene-1, hexene-1, 2-methyl-4-phenylbutene-1, octadecene-1; vinyl chloride, vinyl bromide, vinyl fluoride, vinylidenene chloride, allyl chloride, allyl bromide, methallyl chloride; styrene, α-methylstyrene, p, α-dimethylstyrene, m, α-dimethylstyrene, divinylbenzene, p- chlorostyrene; methyl acrylate, ethyl acrylate, 2-chloroethyl acrylate, n-propyl acrylate, allyl acrylate, n-butyl acrylate, crotyl acrylate, methallyl acrylate, n-amyl acrylate, n-hexyl acrylate, n-octyl acrylate, 2-ethylhexyl acrylate, cyclohexyl acrylate, n-dodecyl acrylate, n-octadecyl acrylate, phenyl acrylate, benzyl acrylate, glyceryl triacrylate, hydroxyethyl acrylate, hydroxypropyl acrylate, hydroxybutyl acrylate; methyl methacrylate, ethyl methacrylate, n-propyl methacrylate, 3-chloropropyl methacrylate, allyl methacrylate, n-butyl methacrylate, crotyl methacrylate, methallyl methacrylate, n-amyl methacrylate, n-hexyl methacrylate, n-octyl methacrylate, 2-ethylhexyl methacrylate, cyclohexyl methacrylate, n-dodecyl methacrylate, n-octadecyl methacrylate, phenyl methacrylate, benzyl methacrylate, ethylene glycol dimethacrylate, diethylene glycol dimethacrylate, triethylene glycol dimethacrylate, tetraethylene glycol dimethacrylate, 1,1,1-trimethoxypropane dimethacrylate, hydroxyethyl methacrylate, hydroxypropyl methacrylate, hydroxybutyl methacrylate; acrylamide, diacetone acrylamide, N-methylacrylamide, N,N'-diethylacrylamide, N-phenylacrylamide, N-methylolacrylamide, N-methylolmethylacrylamide, N-ethoxymethylacrylamide; methacrylamide, diacetone methacrylamide, N-methylolmethacrylamide, N-methylmethacrylamide; acryloyl chloride, acryloyl bromide, acryloyl iodide; methacryloyl chloride, methacryloyl bromide, methacryloyl iodide; acrylic acid, methacrylic acid, itaconic acid; methyl vinyl ketone, ethyl vinyl ketone; methyl vinyl ether, ethyl vinyl ether, n-propyl vinyl ether, n-butyl vinyl ether, n-amyl vinyl ether, n-hexyl vinyl ether, cyclohexyl vinyl ether, phenyl vinyl ether, benzyl vinyl ether, divinyl ether, methyl allyl ether, ethyl methallyl ether, diallyl ether, dimethallyl ether; vinyl acetate, vinyl propionate, vinyl n-butyrate, vinyl benzoate, vinyl n-laurate, isopropenyl acetate, isopropenyl caproate, allyl acetate, allyl propionate, allyl n-laurate, allyl benzoate, methallyl acetate, methallyl propionate; acrylonitrile, methacrylonitrile, vinylidene cyanide, crotononitrile; glycidyl acrylate, glycidyl methacrylate, glycidyl crotonate, monoglycidyl itaconate, diglycidyl itaconate; allyl glycidyl ether, crotyl glycidyl ether, methallyl glycidyl ether; p-vinylbenzamide, N-vinylpyrrolidone, N-vinyl caprolactam; diallyl phthalate, diallyl isophthalate, diallyl itaconate; triallyl cyanurate; maleic anhydride, maleic acid, fumaric acid, or monoesters or diesters of maleic or fumaric acid, such as methyl, ethyl allyl, n-butyl, n-amyl, n-hexyl, cyclohexyl, n-octyl, 2-ethylhexyl, n-dodecyl or n-octadecyl mono- or diesters of maleic or fumaric acid; ethylene glycol dimaleate; N-vinylpyridine; or the like alone or in combination of two or more.

These monomers should be selected so that the polymers produced have a glass transition temperature of 10°C or higher. Particularly important monomers among them are methyl methacrylate, vinyl chloride, acrylonitrile, and styrenes. There may be exemplified a system wherein, for example, polymethyl methacrylate, polyvinyl chloride, vinyl chloride copolymer, polystyrene, styrene-methyl methacrylate copolymer, styrene-acrylonitrile copolymer, polyacrylonitrile and the like are the plastic components. Other monomers whose homopolymers have a glass transition temperature of less than 10°C may only be employed as comonomers. Preferably, at least one monomer selected from methyl methacrylate, vinyl chloride, acrylonitrile and styrenes is contained in an amount of at least 70 mole percent in the ethylenically unsaturated monomer (II).

In the present invention, the unsaturated monomer mixture (II) which can produce plastic materials having not only high impact- and weather-resistance but also good transparency consists of (a) 50 – 100 % by weight of methyl methacrylate and (b) 50 –0 % by weight of one or more unsaturated monomers copolymerizable with methyl methacrylate, and it is preferable that the unsaturated monomers copolymerizable with methyl methacrylate are those which have no adverse effect on the properties of the resulting methyl methacrylate resin. Such unsaturated monomer components copolymerizable with methyl methacrylate are generally employed to enhance the properties of methyl methacrylate resin, for example, to increase fluidity when heated at the molding temperature, or to increase thermal stability or to increase transparency.

Unsaturated monomers copolymerizable with methyl methacrylate which can be used to attain the above objects include, for example, the compounds shown previously other than methyl methacrylate. These unsaturated monomers copolymerizable with methyl methacrylate may be used alone or in combination of two or more, and include unsaturated monomers which form three or more component copolymers, graft copolymers or block copolymers, in combination with methyl methacrylate.

Further, it is essential that the difference in refractive index between the aforesaid olefin-acrylate copolymer (I) and the base resin obtained from the said unsaturated monomer mixture (II) comprising methyl methacrylate as the major component, should be 0.02 or less at 25°C. For this reason, it is necessary to properly select the composition of said copolymer (I). If the difference in refractive index exceeds the limit, the transparency of the resulting methyl methacrylate resin is undesirably reduced.

Typical monomers of the unsaturated monomer mixtures (II) comprising methyl methacrylate as the major component, and the refractive index of the polymers thereof at 25°C are as follows:

| Unsaturated monomers | Refractive index of polymers |
| --- | --- |
| Methyl methacrylate | 1.491 |
| Ethyl methacrylate | 1.484 |
| Isopropyl methacrylate | 1.473 |
| Methyl acrylate | 1.479 |
| Ethyl acrylate | 1.469 |
| n-Butyl acrylate | 1.463 |
| Styrene | 1.591 |
| Acrylonitrile | 1.518 |

From the above list, it is possible to obtain a base resin having any desired refractive index from the unsaturated monomer mixtures (II) comprising methyl methacrylate as the major component, by varying the kind and amount of one or more unsaturated monomers copolymerizable with methyl methacrylate.

Further, the refractive indexes of the olefinacrylate copolymers (I) of the present invention, including those of the alternating copolymers which are important in the present invention, are given below:

| Copolymer composition* | Refractive indexes of copolymers |
|---|---|
| Propylene (36.4)/methyl acrylate (63.6) | 1.480 |
| Propylene (38.1)/ethyl acrylate (61.9) | 1.472 |
| Alternating copolymer isobutylene/methyl acrylate | 1.488 |
| Alternating copolymer isobutylene/ethyl acrylate | 1.480 |
| Alternating copolymer isobutylene/n-butyl acrylate | 1.479 |
| Alternating copolymer isobutylene/2-ethyl-hexyl acrylate | 1.472 |

*Numerals in parentheses represent mole percent.

Polymerization of at least one ethylenically unsaturated monomer (II) in the presence of the olefinacrylate copolymer (I) of the present invention may be conducted by any method such as bulk polymerization, emulsion polymerization, suspension polymerization, solution polymerization or the like. Said olefin-acrylate copolymer (I), in many cases, is readily soluble in ethylenically unsaturated monomers (II) or organic solvents at room temperature or at an elevated temperature, and the solution of said olefin-acrylate copolymers (I) in the ethylenically unsaturated monomers (II) may be subjected to bulk polymerization as such or after being transferred to emulsion or suspension polymerization conditions.

In the case of bulk polymerization, there is a method in which the polymerization is carried out with stirring at a relatively high temperature in order to impart a melt fluidity; a method in which a small amount of a solvent is added to increase the melt fluidity and finally the solvent added is removed together with the remaining ethylenically unsaturated monomers under a reduced pressure at a high temperature; or a cast polymerization method in which the monomers are polymerized in the cast state in a cell consisting of a mold glass and a gasket and the resulting polymers are then removed from the mold glass.

In the emulsion or suspension polymerization method, the solution of said olefin-acrylate copolymer (I) in the ethylenically unsaturated monomer (II) is dispersed in water or a non-solvent as a medium and then polymerized. A method in which water is used as a medium is particularly preferable. Furthermore, it is possible that the olefin-acrylate copolymer (I) itself is synthesized in an aqueous medium, the ethylenically unsaturated monomer (II) is then added thereto, and polymerization is carried out therein. As the dispersing agents used in this case, there may be used any of those used in the reaction of the conventional emulsion or suspension polymerization.

Such dispersions can be prepared by various methods. Preferably, the olefin-acrylate copolymer (I) is dissolved in the ethylenically unsaturated monomer (II) and then the resulting solution is dispersed in water. Particularly preferably, a stable aqueous dispersion in which the polymer is well dispersed can be obtained by effecting the operation in the presence of a suitable surface active agent. For the purpose of such a dispersion, the surface active agent is used in an amount of 0.0001 to 2 parts by weight per 100 parts by weight of the ethylenically unsaturated monomer (II) to obtain a favorable result. As the surface active agent, there may be employed either anionic, nonionic or cationic surfactant, though particularly nonionic and anionic surface active agents are preferable.

Examples of the surface active agents used in the present invention include salts of alkylbenzene sulfonic acids, salts of alkylnaphthalenesulfonic acids, salts of dialkylsulfosuccinic acids, salts of alkyl phosphates, salts of fatty acids, salts of higher alcohol sulfates, naphthalenesulfonic acid-formalin condensation products, salts of polyoxyethylenesulfates and the like for the anionic surfactant; polyoxyethylene alkyl ethers, polyoxyethylene alkylphenyl ethers, polyoxyethylene acyl esters, sorbitane fatty acid esters, polyoxyethylene alkylamines, polyoxyethylene alkylamides and the like for the nonionic surfactant; and alkylamine salts, polyoxyethylene alkylamines, alkylamine acetates and the like for the cationic surfactant.

Furthermore, a combination of an organic acid capable of forming a surfactant, such as a higher fatty acid, for example, oleic acid, linoleic acid, linolenic acid, lauric acid, palmitic acid, or stearic acid; or a resin acid, e.g., dehydroabietic acid, or tetrahydroabietic acid, with a base capable of forming a water-soluble surface active agent, for example, a hydroxide or ammonium or an alkali metal; or an alcoholamine such as triethanolamine, can also accomplish the purpose of dispersion.

Furthermore, the use of a stabilizer in a relatively small amount can increase the mechanical stability of these aqueous dispersions and the stability thereof in the course of production. Preferable stabilizers are phosphates such as sodium orthophosphate, sodium pyrophosphate or sodium tetraphosphate, and ethylenediamine tetraacetate and salts thereof. About 0.00025 to 0.2 part by weight of the phosphate is suitable for the production of these highly stable aqueous dispersions.

Viscosity-increasing agents or protective collids which improve the stability may also be added. Particularly in the suspension polymerization, addition of these materials is important. As the viscosity-increasing agents and protective colloids, there may be used polyvinyl alcohol; polyvinyl methyl ether; polyethylene oxide; polyacrylic acid derivatives such as sodium and ammonium salts of polyacrylic acid and polymethacrylic acid or polyacrylamide; methylcellulose derivatives such as methylcellulose, oxypropylmethylcellulose, carboxylmethylcellulose and the like; vinylacetate-maleic anhydride copolymers; polyvinyl methyl ether-maleic anhydride copolymers; olefin-acrylic acid salt copolymers; synthetic pastes composed mainly of the olefin-acrylic acid salt copolymers; animal pastes such as gelatin, casein and the like; vegetative pastes such as alginates, gum arabic, starch and the like. The amount used thereof varies depending upon the purpose and, in most cases, it is preferable to use the above component in a proportion of about 0.0001 to 5 parts by weight per 100 parts by weight of the ethylenically unsaturated monomer (II).

In the aqueous dispersion in accordance with the present invention, it is preferable to disperse 1 to 300 parts by weight of the ethylenically unsaturated monomer (II) per 100 parts by weight of water.

As the solvent in the solution polymerization, there is used any inert organic compound. Selection of a solvent depends upon the kind of catalyst system employed in the polymerization. In the case of a radical initiator, a large number of solvents may be employed, except those which are apt to cause a chain-transfer, but in the use of an organometallic compound, it is important to select a solvent inert to the compound. In this case, whether or not the resulting polymer is soluble in the organic solvent used is not a problem.

Examples of these solvents include hydrocarbons, halogenated hydrocarbons, ethers, ketones, acid anhydrides, esters, nitriles, amides, amines, sulfoxides and the like. For example, there are exemplified as preferable ones n-pentane, n-hexane, n-heptane, cyclopentane, cyclohexane, benzene, toluene, xylene, ethylbenzene, isopropylbenzene, fluorobenzene, methylene chloride, chloroform, carbon tetrachloride, ethylene dichloride, o-dichlorobenzene, trichloroethylene, perchloroethylene, ethyl bromide, methyl iodide, 1,1,2-trifluoro-1,2,2-trichloroethane, diethyl ether, di-n-propyl ether, propylene oxide, tetrahydrofuran, p-dioxane, acetone, methyl ethyl ketone, cyclohexanone, acetophenone, acetic anhydride, propionic anhydride, ethyl acetate, methyl benzoate, benzyl acetate, diethyl malonate, dioctyl phthalate, acetonitrile, propionitrile, N,N-dimethylformamide, triethylamine, pyridine, dimethylsulfoxide and the like.

If necessary, these polymerization methods may be combined to carry out multi-stage polymerization including pre-polymerization, thereby performing the present invention more effectively.

As the polymerization initiators used in the present invention, all conventional radical initiators are suitable. As the means for initiating such polymerization, any method may be selected which forms a radical by heat, light or other radiations or a chemical reaction. There may be employed, for example, a peroxide, azo compound, redox radical catalyst, ultraviolet light, ionizing radiation, organometallic compound or the like.

These radical initiators can favorably be used in the bulk polymerization, suspension polymerization, solution polymerization and the like, if soluble in the ethylenically unsaturated monomers or organic solvents, and those soluble in water may be employed in an aqueous polymerization system including emulsion polymerization. Examples of oil-soluble radical initiators usable in the present invention include, for example, organic peroxides such as benzoyl peroxide, lauroyl peroxide, t-butyl peroxybenzoate, dicumyl peroxide, methyl ethyl ketone peroxide, diisopropyl peroxydicarbonate, p-chlorobenzoyl peroxide; azo compounds as 2,2'-azobis(isobutyronitrile), 2,2'-azobis(2,4-dimethylvaleronitrile) and the like, and examples of the water-soluble radical initiators include persulfates such as potassium persulfate, or hydroperoxides such as hydrogen peroxide, t-butyl hydroperoxide or the like, as such, and in some cases, they may be used as a redox system in combination with a reducing agent such as sodium bisulfite or a small amount of heavy metal salt, and they are suitable for use as a polymerization initiator in the emulsion polymerization. The amount of the radical initiator required to give, usually, a substantially useful result, is preferably 0.01 to 5 % by weight based upon the weight of the ethylenically unsaturated monomer (II).

In addition, some of the ethylenically unsaturated monomers (II) absorb a light, especially ultraviolet light to be excited and to be polymerized and still more, in some instances, addition of easily dissociable compounds, for example, azo compounds, organohalogen compounds and the like is more effective. It is also possible to initiate the polymerization by the action of radiation, particularly ionizing radiation. It is also possible to initiate the polymerization by blowing gaseous oxygen compounds such as oxygen, ozone and the like into the system where ethylenically unsaturated monomer (II) is present. In this case, the presence of organohalogen compounds, organometallic compounds, halogenometallic compounds and the like promotes the initiation of the chain reaction. Furthermore, there may effectively be used organometallic compounds of metals of Groups II to IV of the Mendeleev Periodic Table, for example, organometallic compounds of metals, such as zinc, boron, aluminum, tin, lead and the like alone or systems obtained by addition of oxygen or peroxides thereto.

In general, the polymerization temperature in the present invention is suitably within the range of from −80°C to +180°C, and a temperature range of from −50°C to +150°C is preferably used.

A variety of chain-transfer agents may be used for the purpose of controlling the molecular weight in the polymerization reaction of the present invention. As these chain-transfer agents, there may be used a variety of compounds having active hydrogen atoms capable of reacting with a radical. Examples of such compounds include mercaptanes, such as n-butylmercaptan, 2-ethylhexylmercaptan, n-dodecylmercaptan, t-dodecylmercaptan, t-tetradecylmercaptan, t-hexadecylmercaptan, thiophenol, thionaphthol and the like; alcohols such as i-propyl alcohol, n-butyl alcohol, sec-butyl alcohol, i-butyl alcohol, t-butyl alcohol, n-amyl alcohol, 2-ethylhexyl alcohol, ethylene glycol, glycerin and the like; halogenated hydrocarbons such as carbon tetrachloride, chloroform, ethylene dibromide, ethyl iodide, and the like. The amount of chain-transfer agent used in the present invention is suitably from 0.001 to 2 % by weight, preferably 0.005 to 1.5 % by weight, based upon the total weight of the ethylenically unsaturated monomers (II).

According to the process of the present invention, a methyl methacrylate resin prepared by polymerizing methyl methacrylate in the presence of the olefin-acrylate copolymer (I) has more excellent weather-resistance than the conventional methyl methacrylate resins prepared by using a rubbery substance containing butadiene. This is because the resulting resin is difficult to deteriorate by light because no double bond is present in the main chain of the olefin-acrylate copolymer. The resin also has better transparency than the conventional methyl methacrylate resins because the refractive index of the olefin-acrylate copolymer (I) is close to that of the base resin. As mentioned above, the methyl methacrylate resin obtained by the process of the present invention can be applied to many uses because of its superior weather-resistance, excellent transparency and high impact-strength. The resin can be used in various fields required weather-resistance, transparency and high impact-strength, for example, the fields of molded products, molded jars, films, substitutes for window glass and paints.

When at least one of the ethylenically unsaturated monomers (II) is polymerized in the presence of the olefin-acrylate copolymer (I), it is desirable to carry out the reaction in an inert atmosphere with a system in which a radical polymerization inhibitor, for example, a peroxide, an azo compound or the like is used. In any convenient step of the process of the present invention, such additives as pigments, ultraviolet light absorbers, heat-stabilizers, color-stabilizers, plasticizers and various fillers may be blended.

The present invention is further explained in detail referring to the following Examples, which are not by way of limitation but by way of illustration. In the Examples, all parts are by weight, unless otherwise specified. Determination of the physical properties in the Examples was carried out based upon the following standards and measured at room temperature unless otherwise stated.

|  | Examples 1 – 16 | Examples 17 – 19 | Examples 20 – 21 | Examples 22 – 24 |
|---|---|---|---|---|
| Impact-strength | ASTM D-256 | JIS K-6871 | JIS K-6745 | JIS K-6740 |
| Tensile strength and elongation | ASTM D-638 | JIS K-6871 | JIS K-6745 | — |
| Vicat softening point | ASTM D-1525 | JIS K-6742 | — | JIS K-6740 |
| Heat distortion temperature | ASTM D-648 | — | ASTM D-648 | — |
| Flex test | — | — | ASTM D-790 | — |
| Optical property | ASTM D-1003 | — | — | — |

Example 1

Five parts of an isobutylene-methyl acrylate alternating copolymer (49.6 mol % of isobutylene and 50.4 mol % of methyl acrylate), the intrinsic viscosity of which was 4.83 dl/g as measured in benzene at 30°C, was put in a 300-ml flask. Five parts of ethyl arcylate and 90 parts of methyl methacrylate were further put in the flask. The flask was then immersed in an oil bath at 80°C, and 165 minutes after the immersion with stirring, a uniform solution was obtained. The resulting solution was then admixed with 0.29 part of dodecyl mercaptan and 0.61 part of benzoyl peroxide and further with an aqueous solution obtained by dissolving 12 parts of a 1.2 % aqueous polysodium methacrylate solution and 0.4 part of sodium phosphate in 190 parts of water. Subsequently, under a stream of nitrogen, polymerization was carried out at 80°C for three hours and at 100°C for an hour to obtain a methyl methacrylate resin. The resulting resin had a Izod impact-strength (notched) of 1.6 kg.cm/cm$^2$, a Vicat softening point of 112.0°C, and a total light transmission of 88.7 % and a haze value of 13.5 %.

For comparison, a commercially available methyl methacrylate resin molding material (SUMIPEX-B MH, a registered trademark of Sumitomo Chemical Co., Ltd.) has an Izod impact-strength (notched) of 1.0 kg.cm/cm$^2$, a Vicat softening point of 115.0°C, a total light transmission of 92.0 % and a haze value of 0.2 %.

Example 2

Five parts of an isobutylene-2-ethyhexyl acrylate alternating copolymer (50.6 mol % of isobutylene and 49.4 mol % of 2-ethylhexyl acrylate), the intrinsic viscosity of which was 2.41 dl/g as measured in benzene at 30°C, were put in a 300-ml flask. Five parts of ethyl arcylate and 90 parts of methyl methacrylate were further put in the flask. The flask was then immersed in an oil bath at 80°C, and 260 minutes after the immersion with stirring. a uniform solution was obtained. Thereafter, a methyl methacrylate resin was obtained in the same manner as in Example 1. The resulting resin had an Izod impact-strength (notched) of 2.6 kg.cm/cm$^2$, a Vicat softening point of 105.4°C, a total light transmission of 75.3 % and a haze value of 48.7 %.

Example 3

Five parts of isobutylene-acrylate alternating terpolymer (48.8 mol % of isobutylene, 48.1 mol % of 2-ethylhexyl acrylate and 3.1 mol % of crotyl acrylate), the intrinsic viscosity of which was 1.83 dl/g as measured in benzene at 30°C, were put in a 300-ml flask. Five parts of ethyl acrylate and 90 parts of methyl methacrylate were further put in the flask. The flask was then immersed in an oil bath at 80°C with stirring to obtain a uniform solution. Thereafter, a methyl methacrylate resin was obtained in the same manner as in Example 1. The resulting resin had an Izod impact-strength (notched) of 2.7 kg.cm/cm$^2$, a Vicat softening point of 105.2°C, a total light transmission of 76.0 % and a haze value of 23.9 %.

Example 4

Ten parts of isobutylene-acrylate alternating terpolymer (50.1 mol % of isobutylene, 46.9 mol % of methyl acrylate and 3.0 mol % of allyl acrylate), the intrinsic viscosity of which was 2.24 dl/g as measured in benzene at 30°C, were put in a 300-ml flask. Five parts of ethyl acrylate and 85 parts of methyl methacrylate were further put in said flask. Then the flask was immersed in an oil bath at 80°C with stirring to obtain a uniform solution. Thereafter, a methyl methacrylate resin was obtained in the same manner as in Example 1. The resulting resin had an Izod impact-strength (notched) of 2.1 kg.cm/cm$^2$, a Vicat softening point of 106.2°C, a total light transmission of 90.0 % and a haze value of 13.0 %.

Example 5

Using the same isobutylene-acrylate alternating terpolymer as used in Example 4, polymerization of methyl methacrylate was carried out in the following manner.

Into a 3-liter flask were charged 50 parts of an alternating terpolymer and 360 parts of methyl methacrylate. The mixture was heated at 80°C with stirring to form a uniform solution. Subsequently, 0.4 part of benzoyl peroxide, 2 parts of dodecylmercaptan, 25 parts of ethyl acrylate and 5 parts of methyl methacrylate were added to the resulting solution, and polymerization was carried out at 80°C for 2 hours under a stream of nitrogen. (An analysis revealed that at this time, 31 % of the mixture of methyl methacrylate and ethyl acrylate had been polymerized.) Then, the reaction product was admixed with 60 parts of methyl methacrylate containing 3.6 parts of benzoyl peroxide, and further with an aqueous solution consisting of 702 parts of water, 45.8 parts of an aqueous solution of 1.2 % of polysodium methacrylate and 1.4 parts of sodium phosphate. After the addition, the final polymerization was carried out at 80°C for 3 hours and at 100°C for an hour under a stream of nitrogen.

The resulting methyl methacrylate resin had an Izod impact-strength (notched) of 4.4 kg.cm/cm$^2$, a Vicat softening point of 104.5°C, a total light transmission of 90.1 % and a haze value of 12.7 %.

Example 6

Lauroyl peroxide (0.18 part) was dissolved in a uniform solution prepared by mixing 90 parts of methyl methacrylate with 10 parts of a propylene-methyl acrylate copolymer (36.4 mol % of propylene and 63.6 mol % of methyl acrylate), the intrinsic viscosity of which was 2.05 dl/g as measured in benzene at 30°C. After the dissolution, air was removed from the resulting solution under a reduced pressure, the solution was poured into a cell composed of two reinforced glass plates, which were maintained in a distance of 3 mm by means of an elastic gasket placed at the edge of the glass plates. The polymerization was carried out at 57°C for 15 hours, at 80°C for 3 hours and at 115°C for 2 hours to obtain a cast sheet of methyl methacrylate resin.

The resulting cast sheet had an Izod impart-strength (notched) of 2.1 kg.cm/cm$^2$, a heat distortion temperature of 72.4°C, a total light transmission of 78.3 % and a haze value of 36.2 %.

For comparison, a commercially available methyl methacrylate resin cast sheet (SUMIPEX, a registered trademark of Sumitomo Chemical Co., Ltd., 3 mm clear sheet) had an Izod impact-strength (notched) of 1.5 kg.cm/cm$^2$, a heat distortion temperature of 109.6°C, a total light transmission of 93.0 % and a haze value of 0.2 %.

Example 7

Lauroyl peroxide (0.18 part) was dissolved in a uniform solution prepared by mixing 90 parts of methyl methacrylate with 10 parts of propylene-methyl acrylate terpolymer (38.1 mol % of propylene, 55.8 mol % of methyl acrylate and 6.1 mol % of allyl acrylate), the intrinsic viscosity of which is 1.85 dl/g as measured in benzene at 30°C. Said solution was thereafter polymerized in the same manner as in Example 6 to obtain a methyl methacrylate resin cast sheet.

The resulting cast sheet had an Izod impact-strength (notched) of 2.9 kg.cm/cm$^2$, a heat distortion temperature of 71.7°C, a total light transmission of 80.1 % and a haze value of 11.8 %.

Example 8

After 0.1 part of 2,2'-azobis(isobutyronitrile) was dissolved in a uniform solution prepared by mixing 90 parts of methyl methacrylate with 10 parts of isobutylene-methyl acrylate alternating copolymer (50.7 mol % of isobutylene and 49.3 mol % of methyl acrylate), the intrinsic viscosity of which was 2.51 dl/g as measured in benzene at 30°C, the solution was polymerized in the same manner as in Examples 6 to obtain a methyl methacrylate resin cast sheet.

The resulting cast sheet had an Izod impact-strength (notched) of 1.9 kg.cm/cm$^2$, a Vicat softening point of 114.3°C, a heat distortion temperature of 69.8°C, a total light transmission of 88.5 %, a haze value of 26.0 %, a tensile strength of 196 kg/cm$^2$, and an elongation of 12.7 %.

For comparison, a commercially available methyl methacrylate resin cast sheet (SUMIPEX a registered trademark of Sumitomo Chemical Co., Ltd., 3 mm clear sheet) had a Vicat softening point of 119.4°C, a tensile strength of 760 kg/cm$^2$, and an elongation of 8.0 %.

Example 9

Substituting 0.18 part of lauroyl peroxide for the 2,2'-azobis(isobutyronitrile) in Example 8, a methyl methacrylate resin cast sheet was obtained in otherwise the same manner as in Example 8.

The resulting cast sheet had an Izod impact-strength (notched) of 2.0 kg.cm/cm$^2$, a Vicat softening point of 114.4°C, a total light transmission of 89.1 %, a haze value of 19.4 %, a tensile strength of 246 kg/cm$^2$ and an elongation of 15.3 %.

Example 10

After 0.1 part of 2,2'-azobis(isobutyronitrile) was dissolved in a uniform solution prepared by mixing 90 parts of methyl methacrylate with 10 parts of isobutylene-acrylate alternating terpolymer (49.7 mol % of isobutylene, 47.1 mol % of methyl acrylate and 3.2 mol % of allyl acrylate), the intrinsic viscosity of which was 2.45 dl/g as measured in benzene at 30°C, the solution was polymerized in the same manner as in Example 6 to obtain a methyl methacrylate resin cast sheet.

The resulting cast sheet had an Izod impact-strength (notched) of 2.8 kg.cm/cm$^2$, a heat distortion temperature of 71.0°C, a total light transmission of 92.4 %, a haze value of 3.5 %, a tensile strength of 92.4 %, a haze value of 3.5 %, a tensile strength of 409 kg/cm$^2$, and an elongation of 25.1%.

Further, this cast sheet was subjected to accelerated exposure (by means of a weather-o-meter Model WE2, produced by Toyo Rika Co., Ltd.) for 500 hours to make a weather resistance test, but no change in color was recognized.

Example 11

After 0.1 part of 2,2'-azobis(isobutyronitrile) was dissolved in a uniform solution prepared by mixing 10 parts of the same isobutylene-acrylate alternating terpolymer as in Example 10, with 87 parts of methyl methacrylate and 3 parts of isopropyl methacrylate, the solution was polymerized in the same manner as in Example 6 to obtain a methyl methacrylate resin cast sheet.

The resulting cast sheet had an Izod impact-strength (notched) of 2.7 kg.cm/cm$^2$, a heat distortion temperature of 72.6°C, a total light transmission of 9.20 %, a haze value of 1.4 %, a tensile strength of 416 kg/cm$^2$ and an elongation of 21.5 %.

Example 12

Lauroyl peroxide (0.18 part) was dissolved in a uniform solution prepared by mixing 90 parts of methyl methacrylate with 10 parts of isobutylene-acrylate alternating terpolymer (49.4 mol % of isobutylene, 44.6 mol % of methyl acrylate and 6.0 mol % of allyl acrylate) having an intrinsic viscosity of 2.37 dl/g as measured in benzene at 30°C and a glass transition temperature of 70°C. Subsequently, the solution was polymerized in the same manner as in Example 6 to obtain a methyl methacrylate resin cast sheet.

The changes in Izod impact-strength (notched), tensile strength, total light transmission and haze value of the resulting cast sheet depending upon measurement temperature are shown in Table 1.

Table 1

| Properties<br>Measurement temperature (°C) | Izod impact-strength (notched) (kg.cm/cm$^2$) | Tensile strength (kg/cm$^2$) | Total light transmission (%) | Haze value (%) |
| --- | --- | --- | --- | --- |
| 24 | 3.4 | 433 | 92.2 | 3.1 |
| 10 | 1.7 | 569 | 92.2 | 1.4 |
| 0 | 1.7 | 674 | 92.3 | 1.2 |
| −20 | 1.5 | 754 | 92.7 | 1.1 |

Example 13

Lauroyl peroxide (0.17 part) was dissolved in a uniform solution prepared by mixing 15 parts of the same isobutylene-acrylate alternating terpolymer as in Example 12 with 85 parts of methyl methacrylate. Subsequently, the solution was polymerized in the same manner as in Example 6 to obtain a methyl methacrylate resin cast sheet.

The resulting cast sheet had an Izod impact-strength (notched) of 5.1 kg.cm/cm$^2$, a heat distortion temperature of 66.2°C, a total light transmission of 90.7 %, a haze value of 5.8 %, a tensile strength of 304 kg/cm$^2$ and an elongation of 38.2 %.

Example 14

Lauroyl peroxide (0.18 part) was dissolved in a uniform solution prepared by mixing 10 parts of isobutylene-acrylate alternating terpolymer (47.2 mol % of isobutylene, 49.9 mol % of methyl acrylate and 2.9 mol % of allyl acrylate), the intrinsic viscosity of which was 2.58 dl/g as measured in benzene at 30°C, with 89.5 parts of methyl methacrylate and 0.5 part of ethylene glycol dimethacrylate. Subsequently, the solution was polymerized in the same manner as in Example 6 to obtain a methyl methacrylate resin cast sheet.

The resulting cast sheet had an Izod impact-strength (notched) of 3.5 kg.cm/cm$^2$, a heat distortion temperature of 90.8°C, a total light transmission of 92.7 %, a haze value of 3.8 %, a tensile strength of 429 kg/cm$^2$ and an elongation of 27.0 %.

Example 15

Lauroyl peroxide (0.18 part) was dissolved in a uniform solution prepared by mixing 90 parts of methyl methacrylate with 10 parts of isobutylene-acrylate alternating terpolymer (50.0 mol % of isobutylene, 44.0 mol % of n-butyl acrylate and 6.0 mol % of allyl acrylate) having an intrinsic viscosity of 3.68 dl/g as measured in benzene at 30°C and a glass transition temperature of −28°C. Subsequently, the solution was polymerized in the same manner as in Example 6 to obtain a methyl methacrylate resin cast sheet.

An investigation was made of changes in Izod impact-strength (notched), tensile strength, total light transmission and haze value of the resulting cast sheet depending upon the measurement temperature. The results are shown in Table 2.

Table 2

| Properties<br>Measurement temperature (°C) | Izod impact-strength (notched) (kg.cm/cm$^2$) | Tensile strength (kg/cm$^2$) | Total light transmission (%) | Haze value (%) |
| --- | --- | --- | --- | --- |
| 24 | 4.5 | 382 | 89.9 | 31.2 |
| 10 | 4.2 | 435 | 90.1 | 14.8 |
| 0 | 3.9 | 471 | 91.2 | 9.4 |
| −20 | 1.8 | 700 | 92.0 | 4.8 |

Example 16

Lauroyl peroxide (0.18 part) was dissolved in a uniform solution prepared by mixing 90 parts of methyl methacrylate with 10 parts of isobutylene-acrylate alternating quadripolymer (20.6 mol % of isobutylene, 46.9 mol % of 2-ethylhexyl acrylate, 27.4 mol % of styrene and 5.1 mol % of allyl acrylate) which had an intrinsic viscosity of 3.51 dl/g as measured in the benzene at 30°C, a refractive index of 1.495 at 25°C and a glass transition temperature of −40.5°C. Subsequently, the solution was polymerized in the same manner as in Example 6 to obtain a methyl methacrylate resin cast sheet.

The resulting case sheet had an Izod impact-strength (notched) of 3.9 kg.cm/cm$^2$ a heat distortion temperature of 70.6°C, a total light transmission of 89.5 %, a haze value of 5.2 %, a tensile strength of 412 kg/cm$^2$ and an elongation of 22.4 %.

Example 17

Into a 10-liter autoclave were charged 10 parts of isobutylene-acrylate alternating terpolymer (48.1 mol % of isobutylene, 45.6 mol % of methyl acrylate and 6.3 mol % of allyl acrylate) having an intrinsic viscosity of 2.47 dl/g as measured in benzene at 30°C. 100 parts of styrene and 20 parts of ethylbenzene were further added thereto. The resulting mixture was stirred for 5 hours at room temperature to obtain a uniform solution. Subsequently, 0.05 part of dicumyl peroxide, 0.03 part of n-dodecylmercaptan and 5 parts of CP-50 (manufactured by Idemitsu Kosan Co. Ltd.) as a mineral oil were added to the solution. The mixtures was polymerized for 3 hours at 125°C and then for 2 hours at 145°C with stirring to obtain a result that the polymerization conversion of styrene was 88.2 % by weight.

The bulk polymerization product was stirred at 210°C for 2 hours under a reduced pressure of 10 mmHg to obtain a polystyrene resin in which the residual volatile content was 0.2 % by weight based upon the total resin. The Izod impact-strength (notched) of the resin was 5.8 kg.cm/cm$^2$ the Vicat softening point was 78.9°C, the tensile strength was 227 kg/cm$^2$, and the elongation was 51.4 %.

Even after the resin subjected to weather irradiation of 200 hours, the impact-strength was 5.7 kg.cm/cm$^2$, and the tensile strength was 218 kg/cm$^2$, both thus remaining almost unchanged. Elongation was 36.2 %, which is slightly lower. Thus the resin showed very excellent weather resistance.

Example 18

Polymerization was carried out in the same manner as in Example 17, except that 10 parts of propylene-acrylate alternating terpolymer (49.7 mol % of propylene, 44.2 mol % of methyl acrylate and 6.1 mol % of allyl acrylate) having an intrinsic viscosity of 2.36 dl/g as measured in benzene at 30°C was substituted for the isobutylene-acrylate alternating terpolymer to obtain the result that the polymerization conversion of styrene was 86.8 % by weight.

Furthermore, by removal of unpolymerized styrene and ethylbenzene as in Example 17, there was obtained a polystyrene resin having a residual volatile content in resin of 0.3 % by weight. The Izod impact-strength (notched) of the resin was 5.9 kg.cm/cm$^2$, the Vicat softening point thereof was 78.0°C, the tensile strength thereof was 218 kg/cm$^2$ and the elongation thereof was 48.6 %.

Example 19

Into a flask having a capacity of 500 cc was charged 10 parts of isobutylene-acrylate alternating terpolymer (48.1 mole % of isobutylene, 45.6 mol % of methyl acrylate and 6.3 mol % of allyl acrylate) having an intrinsic viscosity of 2.47 dl/g as measured in benzene at 30°C, and 100 parts of styrene was then added thereto. The mixture was stirred for 5 hours at room temperature to obtain a uniform solution. Subsequently, 0.12 part of n-dodecylmercaptan, and 5 parts of CP-50 as a mineral oil were added thereto and the mixture was polymerized at 115°C for 4 hours to obtain the result that the polymerization conversion of styrene was 20.5 % by weight. After being cooled to room temperature, the resulting polymer was transferred to an autoclave having a capacity of one liter, and 0.35 part of benzoyl peroxide, 0.08 part of t-butyl peroxybenzoate, and a dispersion of 0.12 part of tricalcium phosphate, and 0.0005 part of sodium dodecyl benzene sulfonate as suspending agents in 100 parts of water were then added. The mixture was suspended-polymerized at 92°C for 3.5 hours and then at 135°C for an hour.

The Izod impact-strength (notched) of the resulting polystyrene resin was 5.3 kg.cm/cm$^2$, the Vicat softening point was 80.1°C, the tensile strength was 225 kg/cm$^2$ and the elongation was 54.0 %.

Example 20

Into a flask having a capacity of 3 liters was charged 8 parts of isobutylene-acrylate alternating terpolymer (48.1 mol % of isobutylene, 45.6 mol % of methyl acrylate and 6.3 % of allyl acrylate) having an intrinsic viscosity of 2.47 dl/g as measured in benzene at 30°C. 30 parts of acrylonitrile and 70 parts of styrene were added thereto and the resulting mixture was stirred at room temperature for 5 hours to obtain a uniform solution. Thereafter, 0.03 part of benzoyl peroxide was added thereto and the mixture was polymerized at 75°C. 0.4 part of t-dodecyl-mercaptan was added thereto 2.5 hours after initiation of polymerization, and the polymerization was continued for a further 2.5 hours at 75°C to obtain the result that the polymerization conversion was 24.2 % by weight based upon the total weight of acrylonitrile and styrene.

The product was cooled to room temperature and then transferred to an autoclave having a capacity of 15 liters. 0.12 part of lauroyl peroxide was added thereto and furthermore there was added an aqueous solution of 0.14 part of polyvinyl alcohol having a degree of saponification of 88 % and a degree of polymerization of 2,000 and 0.06 part of methyl hydroxypropyl cellulose (methollose) having a methoxy group content of 21 % and a hydroxypropoxy group content of 8 % as suspending agents in 300 parts of water, and the mixture was suspended well. There had previously been dissolved in the aqueous phase 6 parts of acrylonitrile to prevent dissolution of acrylonitrile therein and 0.15 part of sodium bisulfite to prevent polymerization of acrylonitrile in the aqueous phase. The suspension was subjected to polymerization at 70°C for 3 hours and unpolymerized acrylonitrile was stripped off by introducing steam at 150°C for 2 hours.

The amount of the residual monomer in the resulting resin was 0.03 % by weight. The Charpy impact-strength (notched) thereof was 5.8 kg.cm/cm$^2$, the tensile strength was 606 kg/cm$^2$, the elongation was 80.1 %, the flexural strength was 650 kg/cm$^2$ and the heat distortion temperature was 93.5°C.

Even after the resulting resin was subjected to weather irradiation for 200 hours, the impact-strength was 5.5 kg.cm/cm$^2$, and the tensile strength was 570 kg/cm$^2$, thus substantially no change was observed in respect of these properties, though the elongation was 63.8 % which was slightly lower. Therefore, the resin was very excellent in weather resistance.

Example 21

Polymerization was carried out in the same manner as in Example 20, except that 30 parts of acrylonitrile, 65 parts of styrene and 5 parts of α-methylstyrene were substituted for the monomers. Consequently, the polymerization conversion at the termination of bulk polymerization was 22.6 % by weight based upon the total weight of acrylonitrile, styrene and α-methylstyrene. The amount of the residual monomer after suspension polymerization and stripping was 0.10 % by weight.

The Charpy impact-strength (notched) of the polymer was 5.6 kg.cm/cm$^2$, the tensile strength was 586 kg/cm$^2$, the elongation was 75.8 %, the flexural strength was 640 kg/cm$^2$ and the heat distortion temperature was 97.3°C.

Example 22

Into a 5-liter stainless steel autoclave equipped with a stirrer were charged 8 parts of isobutylene-ethyl acrylate alternating copolymer (49.6 mol % of isobutylene and 50.4 mol % of ethyl acrylate) having an intrinsic viscosity of 2.18 al/g as measured in benzene at 30°C, 92 parts of vinyl chloride, 150 parts of deionized water and 0.3 part of methyl cellulose. The mixture was stirred at 45°C for 2 hours to dissolve said alternating copolymer in vinyl chloride sufficiently. Subsequently, 0.1 part of azobisisobutyronitrile was added thereto and the mixture was polymerized at 64°C for 6 hours to give a vinyl chloride resin. The Izod impact-strength (notched) of the resin was 8.3 kg.cm/cm$^2$, and the Vicat softening point thereof was 81.5°C.

For comparison, the Izod impact-strength (notched) of a commercially available resin (Sumilit S-7G, a trade name of Sumitomo Chemical Co., Ltd.) was 2.5 kg·cm/cm$^2$ and the vicat softening point thereof was 83.2°C.

Example 23

A vinyl chloride resin was obtained in the same manner as in Example 22, except that 8 parts of isobutylene-acrylate alternating terpolymer (49.8 mol % of isobutylene, 46.7 mol % of ethyl acrylate and 3.5 mol % of allyl acrylate) having an intrinsic viscosity of 3.28 dl/g as measured in benzene at 30°C was substituted for the alternating copolymer. The Izod impact-strength (notched) of the resin obtained was 9.5 kg.cm/cm² and the Vicat softening point thereof was 81.6°C.

Example 24

13 parts of isobutylene-n-butyl acrylate alternating copolymer (49.7 mol % of isobutylene and 50.3 mol % of n-butyl acrylate) having an intrinsic viscosity of 2.56 dl/g as measured in benzene at 30°C, 87 parts of vinyl chloride, 150 parts of deionized water and 0.3 part of methyl cellulose were charged into a 5-liter stainless steel autoclave, and the mixture was stirred at 45°C for 2 hours to dissolve sufficiently said alternating copolymer in vinyl chloride.

0.15 part of azobisisobutyronitrile was added thereto and the mixture was polymerized at 60°C for 6 hours to obtain a vinyl chloride resin. The Izod impact-strength (notched) of the resin was 11.3 kg.cm/cm² and the Vicat softening point thereof was 83.6°C. For comparison, the Izod impact-strength (notched) of a commercially available vinyl chloride resin (Sumilit S-11H, a trade name of Sumitomo Chemical Co., Ltd.) was 3.1 kg.cm/cm² and the Vicat softening point thereof was 89.5°C.

what is claimed is:

1. A process for producing an impact-resistant, rubber-modified, plastic material, which comprises polymerizing 40 to 99 parts by weight of at least one ethylenically unsaturated monomer (II) capable of forming a plastic material having a glass transition temperature of 10°C or higher, in the presence of 1 to 60 parts by weight of an olefin-acrylate copolymer (I) comprising as the essential components at least one olefin having 3 to 20 carbon atoms and at least one acrylate in which the alcohol moiety has 1 to 20 carbon atoms, wherein the ethylenically unsaturated monomer is selected from the group consisting of vinyl and vinylidene compounds having the formula,

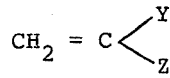

wherein Y and Z are independently hydrogen, —R, —COOR,

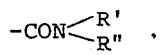

—COX, —COOH, —COR, —OR, —OCOR or —CN, in which R is a hydrocarbon group of a hydrocarbon group or a hydrocarbon group containing at least one atom selected from the group consisting of oxygen and nitrogen, and R' and R'' are independently a hydrocarbon group.

2. A process according to claim 1, wherein the acrylate of the olefin-acrylate copolymer (I) has no ethylenic unsaturation in the alcohol moiety.

3. A process according to claim 1, wherein the olefin-acrylate copolymer (I) comprises at least one acrylate having no ethylenic unsaturation in the alcohol moiety and at least one acrylate having ethylenic unsaturation in the alcohol moiety.

4. A process according to claim 1, wherein the ethylenically unsaturated monomer is selected from the group consisting of methyl methacrylate, acrylonitrile and styrenes.

5. A process according to claim 1, wherein the olefin-acrylate copolymer (I) comprises at least one olefin having 3 to 20 carbon atoms and at least one acrylate in which alcohol moiety has 1 to 20 carbon atoms and no ethylenic unsaturation, and the at least one ethylenically monomer (II) is a mixture of (a) 50 to 100 % by weight of methyl methacrylate and (b) 50 to 0 % by weight of at least one unsaturated monomer copolymerizable with methyl methacrylate, the difference between the refractive index of the olefin-acrylate copolymer (I) and the refractive index of the resin obtained from the unsaturated monomer mixture (II) being 0.02 or less at 25°C.

6. A process for producing an impact-resistant, rubber-modified plastic material, which comprises polymerizing 40 to 99 parts by weight of at least one ethylenically unsaturated monomer (II) capable of forming a plastic material having a glass transition temperature of 10°C or higher, in the presence of 1 to 60 parts by weight of an olefin-acrylate copolymer (I) consisting of at least one olefin having 3 to 20 carbon atoms, at least one acrylate in which the alcohol moiety has 1 to 20 carbon atoms, and 0.1 to 30 mole % of at least one copolymerizable monomer, wherein the ethylenically unsaturated monomer is selected from the group consisting of vinyl and vinylidene compounds having the formula,

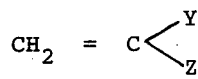

wherein Y and Z are independently hydrogen, —R, —COOR,

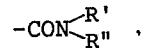

—COX, —COOH, —COR, —OR, —OCOR or —CN, in which R is a hydrocarbon group or a hydrocarbon group or a hydrocarbon group containing at least one atom selected from the group consisting of oxygen and nitrogen, and R' and R'' are independently a hydrocarbon group.

7. A process according to claim 6, wherein the copolymerizable monomer is selected from the group consisting of styrene and its homologs, dienic hydrocarbons, dienic halohydrocarbons, unsaturated esters of carboxylic acids, unsaturated ethers, acrylonitrile, acryloyl halides, acrylic acid, acrylamide and its homologs, and maleic acid and its derivatives.

8. A process according to claim 6, wherein the copolymerizable monomer is a polyenic compound having at least one unsaturated group besides the polymerizable double bonds.

9. A process according to claim 8 wherein the polyenic compounds is selected from the group consisting of dienic hydrocarbons, dienic halohydrocarbons, unsaturated esters of unsaturated carboxylic acids and unsaturated ethers.

10. A process according to claim 6, wherein the olefin-acrylate copolymer (I) consists of at least one olefin having 3 to 20 carbon atoms, at least one acrylate in which the alcohol moiety has 1 to 20 carbon atoms and no ethylenic unsaturation and 0.1 to 30 mole percent of an acrylate or methacrylate in which the alcohol moiety has 2 to 20 carbon atoms and ethylenic unsaturation, and the at least one ethylenically unsaturated monomer (II) is a mixture of (a) 50 to 100 % by weight of methyl methacrylate and (b) 50 to 0 % by weight of at least one unsaturated monomer copolymerizable with methyl methacrylate, the difference between the refractive index of the olefin-acrylate copolymer and the refractive index of the resin obtained from said unsaturated obtained mixture (II) being 0.02 or less at 25°C.

11. A process according to claim 1, wherein the polymerization is effected at a temperature of from −80°C to +180°C.

12. A process according to claim 1, wherein the polymerization is effected at a temperature of from −50°C to +150°C.

13. A process according to claim 1, wherein the polymerization is effected in bulk.

14. A process according to claim 1, wherein the polymerization is effected in a medium.

15. A process according to claim 14, wherein the medium is water or a non-solvent for the ethylenically unsaturated monomer (II).

16. A process according to claim 15, wherein the medium contains a surface active agent.

17. A process according to claim 24, wherein the medium is a solvent for the ethylenically unsaturated monomer (II).

18. A process according to claim 1, wherein the polymerization is effected with a radical initiator.

19. A process according to claim 18, wherein the radical initiator is an oil-soluble initiator selected from the group consisting of organic peroxides, and azo compounds.

20. A process according to claim 18, wherein the radical initiator is a water-soluble initiator selected from the group consisting of persulfates and hydroperoxides.

21. A process according to claim 18, wherein the radical initiator is used in a proportion of 0.01 to 5 % by weight based on the weight of the ethylenically unsaturated monomer (II).

22. A process according to claim 1, wherein the olefin-acrylate copolymer (I) has an intrinsic viscosity of from 0.1 to 10 dl/g as measured in benzene at 30°C.

23. A graft-copolymer composition of 40 to 99 parts by weight of at least one ethylenically unsaturated monomer (II) represented by the formula,

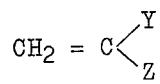

wherein Y and Z are independently hydrogen, a —R, —COOR,

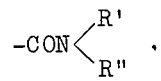

—COX, —COOH, —COR, —OR, —OCOR or —CN, in which R is a hydrocarbon group or a hydrocarbon group containing at least one atom selected from the group consisting of halogens, oxygen and nitrogen, and R' and R'' independently a hydrocarbon group, on 1 to 60 parts by weight of an olefin-acrylate copolymer (I) comprising at least one olefin having 3 to 30 carbon atoms and at least one acrylate in which the alcohol moiety has 1 to 20 carbon atoms.

24. A graft-copolymer composition according to claim 23, wherein the ethylenically unsaturated monomer (II) is selected from the group consisting of methyl methacrylate, acrylonitrile and styrenes.

25. A graft copolymer composition according to claim 23, wherein the ethylenically unsaturated monomer (II) comprises at least 70 mole percent of at least one monomer selected from the group consisting of methyl methacrylate, acrylonitrile and styrenes.

* * * * *